United States Patent
Nagayoshi

(10) Patent No.: US 12,255,024 B2
(45) Date of Patent: Mar. 18, 2025

(54) CAPACITOR WITH BARIUM TITANATE DIELECTRIC LAYERS

(71) Applicant: KYOCERA Corporation, Kyoto (JP)

(72) Inventor: Maiko Nagayoshi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 142 days.

(21) Appl. No.: 17/799,092

(22) PCT Filed: Feb. 1, 2021

(86) PCT No.: PCT/JP2021/003582
§ 371 (c)(1),
(2) Date: Aug. 11, 2022

(87) PCT Pub. No.: WO2021/171920
PCT Pub. Date: Sep. 2, 2021

(65) Prior Publication Data
US 2023/0082288 A1   Mar. 16, 2023

(30) Foreign Application Priority Data
Feb. 27, 2020  (JP) .................................. 2020-031925

(51) Int. Cl.
*H01G 4/30* (2006.01)
*C04B 35/468* (2006.01)
(Continued)

(52) U.S. Cl.
CPC ........... *H01G 4/30* (2013.01); *C04B 35/4682* (2013.01); *H01G 4/012* (2013.01); *H01G 4/1227* (2013.01);
(Continued)

(58) Field of Classification Search
CPC ........ H01G 4/30; H01G 4/012; H01G 4/1227; H01G 4/12; H01G 4/1209; C04B 35/4682;
(Continued)

(56) References Cited

U.S. PATENT DOCUMENTS

| | | | | |
|---|---|---|---|---|
| 6,489,257 B1 * | 12/2002 | Hiramatsu | ........... | H01G 4/1227 361/321.5 |
| 2001/0012561 A1 * | 8/2001 | Chazono | ................. | B32B 19/04 428/338 |

(Continued)

FOREIGN PATENT DOCUMENTS

| | | | | |
|---|---|---|---|---|
| DE | 102011053740 A1 * | 3/2013 | ............ | B22F 1/0014 |
| JP | 2002080276 A * | 3/2002 | ............ | C04B 35/468 |

(Continued)

*Primary Examiner* — Nathan Milakovich
*Assistant Examiner* — Daniel M Dubuisson
(74) *Attorney, Agent, or Firm* — Volpe Koenig

(57) ABSTRACT

A capacitor includes a stack and an external electrode located on a surface of the stack. The stack includes a plurality of dielectric layers and a plurality of internal electrode layers alternately stacked on one another. Crystal grains include first crystal grains having a small grain size and second crystal grains having a larger grain size. The first crystal grains satisfy 0.13 μm≤d1<0.30 μm, where d1 is the grain size of the first crystal grains. The second crystal grains satisfy 0.30 μm≤d2<0.50 μm, where d2 is the grain size of the second crystal grains. The second crystal grains have a higher additive element content than the first crystal grains.

5 Claims, 2 Drawing Sheets

(51) Int. Cl.
*H01G 4/012* (2006.01)
*H01G 4/12* (2006.01)

(52) U.S. Cl.
CPC .. *C04B 2235/5445* (2013.01); *C04B 2235/85* (2013.01); *H01G 4/12* (2013.01)

(58) Field of Classification Search
CPC ........ C04B 2235/5445; C04B 2235/85; C04B 35/64; C04B 2235/3203; C04B 2235/3215; C04B 35/468; C04B 2235/3206; C04B 2235/3208; C04B 2235/3224; C04B 2235/3418; C04B 2235/36; C04B 2235/6025; C04B 2235/6562; C04B 2235/6582; C04B 2235/663; C04B 2235/75; C04B 2235/783; C04B 2235/785; C04B 2235/79

See application file for complete search history.

(56) References Cited

U.S. PATENT DOCUMENTS

| | | | | |
|---|---|---|---|---|
| 2003/0113446 A1* | 6/2003 | Hasegawa | ............ | C01G 45/006 427/372.2 |
| 2007/0155613 A1* | 7/2007 | Ito | ............ | H01G 4/1227 501/137 |
| 2010/0128414 A1* | 5/2010 | Azuma | ............ | C04B 35/62645 361/313 |
| 2010/0195265 A1* | 8/2010 | Nakamura | ............ | C04B 35/50 501/134 |
| 2011/0222205 A1* | 9/2011 | Muraki | ............ | C01G 23/006 361/321.5 |
| 2014/0135203 A1* | 5/2014 | Choi | ............ | C04B 35/4682 501/137 |
| 2014/0254063 A1* | 9/2014 | Konishi | ............ | H01G 4/30 361/301.4 |
| 2014/0285950 A1* | 9/2014 | Morita | ............ | H01G 4/012 361/321.2 |
| 2017/0287635 A1* | 10/2017 | Sakurai | ............ | H01G 4/012 |
| 2018/0261758 A1* | 9/2018 | Kitazaki | ............ | C04B 35/62897 |

FOREIGN PATENT DOCUMENTS

| | | | |
|---|---|---|---|
| JP | 2005-33070 A | | 2/2005 |
| JP | 2005-243890 A | | 9/2005 |
| JP | 2008-10530 A | | 1/2008 |
| JP | 2013197492 A | * | 9/2013 |
| JP | 2014-090119 A | | 5/2014 |

* cited by examiner

CAPACITOR WITH BARIUM TITANATE DIELECTRIC LAYERS

TECHNICAL FIELD

The present disclosure relates to a stacked capacitor.

BACKGROUND OF INVENTION

A known technique is described in, for example, Patent Literature 1.

CITATION LIST

Patent Literature

Patent Literature 1: Japanese Unexamined Patent Application Publication No. 2005-243890

SUMMARY

In an aspect of the present disclosure, a capacitor includes a stack including a plurality of dielectric layers and a plurality of internal electrode layers alternately stacked on one another, and an external electrode located on a surface of the stack and electrically connected to the plurality of internal electrodes. The plurality of dielectric layers includes crystal grains containing barium titanate and an additive element. The crystal grains include first crystal grains and second crystal grains having a grain size larger than the first crystal grains. The first crystal grains satisfy 0.13 µm≤d1<0.30 µm, where d1 is a grain size of the first crystal grains. The second crystal grains satisfy 0.30 µm≤d2<0.50 where d2 is the grain size of the second crystal grains. The second crystal grains have a higher additive element content than the first crystal grains.

BRIEF DESCRIPTION OF THE DRAWINGS

The objects, features, and advantages of the present disclosure will be more apparent from the detailed description and the drawings below.

DESCRIPTION OF EMBODIMENTS

A capacitor with the structure that forms the basis of a capacitor according to one or more embodiments of the present disclosure is an electric component included in an electronic device. The capacitor is to have higher capacitance and improved various characteristics.

For example, the stacked ceramic capacitor described in Patent Literature 1 includes dielectric layers including two different types of grains with mean grain sizes meeting a specific relationship between them. This capacitor has higher capacitance as well as improved withstand voltage and DC (direct current) bias characteristics.

A capacitor according to one or more embodiments of the present disclosure will now be described with reference to the drawings. The capacitor according to one or more embodiments of the present disclosure is not limited to the specific embodiments described below. The capacitor according to one or more embodiments of the present disclosure may be embodied in various forms without departing from the spirit or the scope of the general idea defined by the appended claims.

Figure 1:
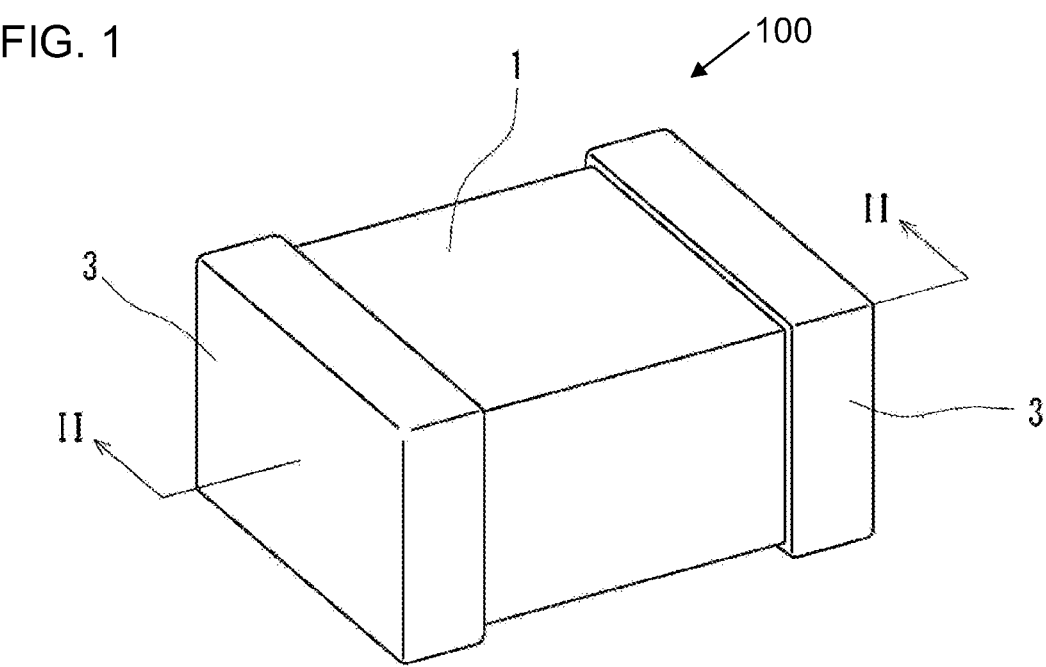
FIG. 1 is an external perspective view of a capacitor.
Figure 2:
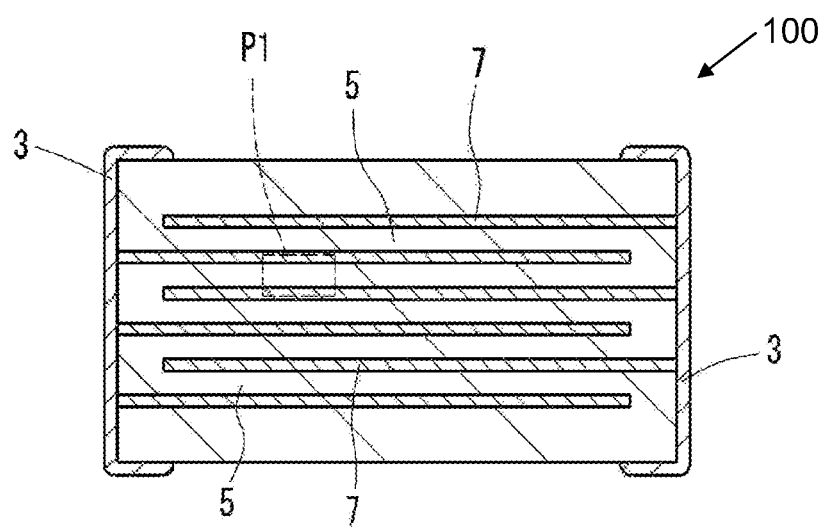
FIG. 2 is a cross-sectional view taken along a section line II-II in FIG. 1.

FIG. 1 is an external perspective view of a capacitor. FIG. 2 is a cross-sectional view taken along a section line in FIG. 1. A capacitor 100 according to an embodiment of the present disclosure includes a stack 1 and external electrodes 3 on the surfaces of the stack 1. The stack 1 includes dielectric layers 5 and internal electrode layers 7 that are stacked alternately. The stack 1 in the present embodiment is, for example, a rectangular prism and includes the dielectric layers 5 and the internal electrode layers 7 both being rectangular in a plan view in the stacking direction. Each internal electrode layer 7 has one side exposed on one side surface of the stack 1. The external electrodes 3 covering the side surfaces of the stack 1 are electrically connected to the internal electrode layers 7. Although FIG. 2 illustrates a stack of several dielectric layers 5 and several internal electrode layers 7 to simplify the drawing, the stack 1 may include, for example, several hundred dielectric layers 5 and several hundred internal electrode layers 7.

Figure 3:
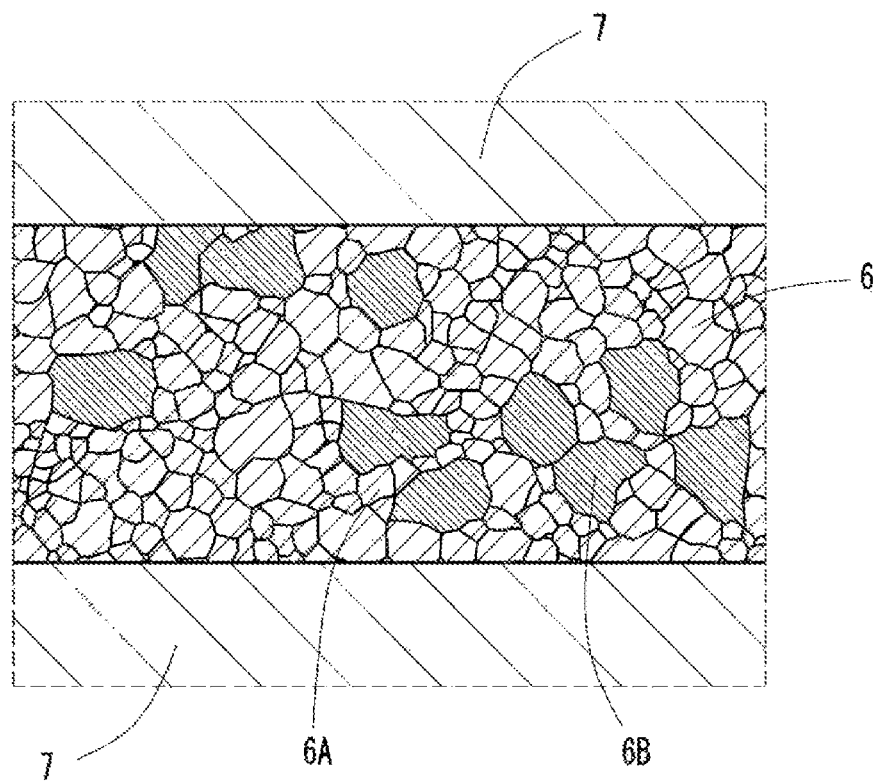
FIG. 3 is an enlarged schematic cross-sectional view of a dielectric layer.

FIG. 3 is an enlarged schematic cross-sectional view of a dielectric layer. Each dielectric layer 5 includes crystal grains 6 containing barium titanate and an additive element. The crystal grains 6 include first crystal grains 6A and second crystal grains 6B having a larger grain size than the first crystal grains 6A. The crystal grains 6 contain barium titanate as a main component and an additive element. A main component herein refers to a component with the highest content in the crystal grains 6. The crystal grains 6 containing barium titanate as a main component thus refer to the crystal grains 6 having higher contents of titanium and barium than other components.

The additive element is at least one selected from the group consisting of dysprosium (Dy), magnesium (Mg), calcium (Ca), manganese (Mn), and silica (Si). The additive element contained in the crystal grains 6 is, for example, diffused in the crystals of barium titanate.

The crystal grains 6 include the first crystal grains 6A with a smaller size and the second crystal grains 6B with a larger size. The crystal grains 6 satisfy 0.13 µm≤d1<0.30 µm and 0.30 µm≤d2<0.50 µm, where d1 is the grain size of the first crystal grains 6A and d2 is the grain size of the second crystal grains 6B. The grain size of the crystal grains 6 can be measured by analyzing an electron micrograph of the cross section of the dielectric layers 5. In the electron micrograph of the cross section, for example, an area containing 200 to 300 crystal grains 6 is specified, and the outline of each crystal grain 6 included in the area is then extracted to determine the cross-sectional area of the crystal grains 6 using a known image analysis program. The circular equivalent diameter of each crystal grain 6 is calculated based on the determined cross-sectional area and used as the grain size. The crystal grains 6 included in the dielectric layers 5 may include crystal grains with a grain size of 0.13 µm or smaller and crystal grains with a grain size of 0.50 µm or larger.

For the first crystal grains 6A and the second crystal grains 6B, the additive element content of the second crystal grains 6B is greater than the additive element content of the first crystal grains 6A. The dielectric layers 5 including crystal grains with a relatively large grain size such as the second crystal grains 6B can have a higher dielectric constant. This thus allows the capacitor 100 to have intended capacitance. However, the dielectric layers 5 including crystal grains with a relatively large grain size such as the second crystal grains 6B have a smaller percentage of grain boundaries per unit volume, thus easily degrading the capacitor characteristics. The capacitor characteristics are degraded by oxygen vacancies moving between the internal electrode layers 7. In the crystal grains 6, oxygen vacancies move easily and grain boundaries have high moving resistance to the oxygen vacancies. The characteristics are thus likely to degrade as the percentage of the grain boundaries decreases. The second crystal grains 6B with a higher additive element content than the first crystal grains 6A have higher moving resistance to oxygen vacancies, causing less degradation of the characteristics and improving the reliability of the capacitor. The capacitor characteristics in the present embodiment include, for example, DC voltage characteristics in a high-temperature environment.

The second crystal grains 6B having a higher additive element content than the first crystal grains 6A refer to the second crystal grains 6B having the lowest additive element content being higher in the comparison between the highest additive element content of the first crystal grains 6A and the lowest additive element content of the second crystal grains 6B.

The additive element contents of the first and second crystal grains 6A and 6B are measured through element analysis conducted using the crystal grains in the cross section of the dielectric layers 5 with a transmission electron microscope (EDX-TEM) including an elemental analyzer. The concentration (atomic %) of each additive element is measured at a position with a distance of 100 nm from the grain boundaries. The additive element contents of the first and second crystal grains 6A and 6B can be obtained by calculating the sum of the concentration of each element.

The second crystal grains 6B in the dielectric layers 5 may have, for example, an area percentage of 4 to 18% inclusive per unit area in the cross section of the dielectric layers 5. The percentage of an area occupied by the second crystal grains 6B can be measured, for example, in the manner described below. For the capacitor 100, the total area of a predetermined cross section (e.g., a longitudinal cross section of any dielectric layer 5) is S0, and the sum of the cross-sectional areas of the second crystal grains 6B in the predetermined cross section is S2. The cross-sectional areas of the second crystal grains 6B can be measured by analyzing an electron micrograph in the same or similar manner as for the grain size measurement. The area percentage A2 of the second crystal grains 6B is calculated as (S2/S0)×100 (%) using these areas. When the second crystal grains 6B have an area percentage within the above ranges, the dielectric layers 5 are less likely to degrade the characteristics and improve the reliability of the capacitor. The second crystal grains 6B having an area percentage outside the above ranges can also be used practically, although such second crystal grains 6B cannot sufficiently reduce the degradation of the characteristics.

The first dielectric layers 5 include the second crystal grains 6B in a manner to have, for example, second crystal grains 6B continuous with one another in the cross section of the dielectric layers 5 being two or fewer second crystal grains 6B. As more second crystal grains 6B are continuous with one another, the second crystal grains 6B are arranged unevenly. In an area containing the second crystal grains 6B arranged unevenly, fewer first crystal grains 6A are arranged, and thus the percentage of grain boundaries decreases locally. When the second crystal grains 6B continuous with one another are two or fewer second crystal grains 6B, or in other words, when the second crystal grains 6B continuous with one another are less than three second crystal grains 6B, the characteristics are less likely to be degraded, and the reliability of the capacitor are improved further.

The first crystal grains 6A are small grains with a grain size of smaller than 0.3 µm. The second crystal grains 6B are large grains with a grain size of 0.3 µm or larger. When the crystal grains 6 in the dielectric layer 5 have various grain sizes, the capacitor can easily have varying characteristics that can be degraded greatly. To reduce the variations in the grain sizes, the crystal grains 6 may satisfy 2D1≤D2<3D1, where D1 is the arithmetic mean grain size of the first crystal grains 6A and D2 is the arithmetic mean grain size of the second crystal grains 6B. The arithmetic mean grain sizes D1 and D2 can be measured by analyzing an electron micrograph of the cross section of the dielectric layers 5 in the same or similar manner as for measuring the grain sizes d1 and d2. The arithmetic mean grain size may be calculated for crystal grains included in the first crystal grains 6A. The arithmetic mean grain size may be calculated for crystal grains included in the second crystal grains 6B. When the arithmetic mean grain sizes D1 and D2 satisfy 2D1≤D2, the grain sizes of the first crystal grains 6A and the second crystal grains 6B differ from each other by a certain degree. When the arithmetic mean grain sizes D1 and D2 satisfy D2<3D1, the grain sizes have less variations. This can reduce variations in the characteristics of the capacitor.

The internal electrode layers 7 are made of a metal material. Examples of the metal material include nickel (Ni), copper (Cu), palladium (Pd), and silver (Ag). An alloy containing one or more of such metal materials may also be used. The external electrodes 3 may include the same or similar metal material to the internal electrode layers 7.

Figure 4:
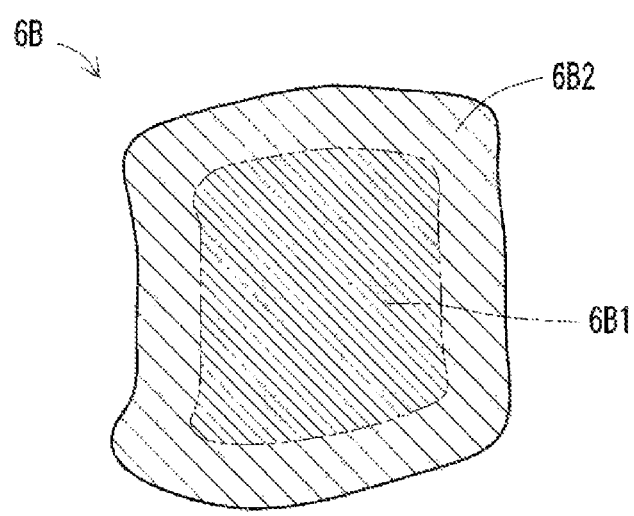
FIG. 4 is an enlarged schematic view of a second crystal grain.

The capacitor according to another embodiment of the present disclosure will now be described. In the present embodiment, the second crystal grains 6B have a core-shell structure. The capacitor has the same structure as in the above embodiment except the second crystal grains 6B, and will not be described in detail. FIG. 4 is an enlarged schematic view of a second crystal grain in the present embodiment. The core-shell structure refers to a single crystal grain including a core and a shell. Each second crystal grain 6B in the present embodiment includes a core 6B1 containing barium titanate crystals, and a shell 6B2 surrounding the core 6B1 and containing an additive element diffused into the barium titanate crystals. The core-shell structure can be identified using an electron micrograph of the cross section of the dielectric layers 5. In the core 6B1 containing barium titanate crystals, a stripe pattern indicating a domain structure is observed, but is not observed in the shell 6B2. The shell 6B2 containing an additive element dispersed in the shell 6B2 has high moving resistance to oxygen vacancies in the same or similar manner to grain boundaries. The shell 6B2 thus reduces the degradation of the characteristics and further improves the reliability of the capacitor. The shell 6B2 in the second crystal grain 6B may have, for example, a thickness of 0.05 to 0.13 µm.

A method for manufacturing the capacitor according to one or more embodiments of the present disclosure will now be described. A stack is first fabricated. Two different powders with different Ba—Ti ratios are used as raw materials containing barium titanate as a main component. The raw powder having a larger Ba—Ti ratio has a mean particle size smaller than the raw powder having a smaller Ba—Ti ratio. Dy, Mg, and Ca to be additive elements are added as Dy$_2$O$_3$, Mg$_2$CO$_3$, and a glass powder (e.g., with a composition of 55 mol % of $SiO_2$, 20 mol % of BaO, 15 mol % of CaO, and 10 mol % of $Li_2O_3$). Raw powders of barium titanate and the additive elements are mixed with dispersants in a solvent to obtain slurry. The obtained slurry is then used to form green sheets by doctor blading. A metal paste including a metal material such as nickel as a main component is prepared. The metal paste is printed on the surface of the green sheets to obtain green sheets with the metal paste. The green sheets with the metal paste are stacked and then fired to obtain stacks. After the stacks are barrel-polished, a metal paste for external electrodes is applied to the two ends of each stack. The stacks are then thermally treated at 800° C. to form external electrodes. The paste for the external electrodes contains a Cu powder and glass. The surfaces of the external electrodes are then plated with Ni and then Sn using an electrolytic barrel machine to obtain capacitors. The surfaces of the external electrodes may be plated with a single layer or multiple layers.

EXAMPLES

For the barium titanate raw material powder, a raw material powder with the Ba—Ti ratio of 1.006 (raw material 1) and a raw material powder with the Ba—Ti ratio of 1.000 (raw material 2) were used. The raw material 1 had a mean particle size of 0.15 μm. The raw material 2 had a mean particle size of 0.3 μm. As additive elements, diprosium and magnesium, or specifically $Dy_2O_3$ and $Mg_2CO_3$, were added. A calcium carbonate powder ($CaCO_3$), a manganese carbonate powder ($MnCO_3$), and a glass powder (with a composition of 55 mol % of $SiO_2$, 20 mol % of BaO, 15 mol % of CaO, and 10 mol % of $Li_2O_3$) were also used as other additives. A mixed solvent of toluene and alcohol was added to wet-blend these powders using zirconia balls with a diameter of 5 mm.

Subsequently, the wet-blended powder was placed into a mixed solvent of toluene and alcohol in which polyvinyl butyral resin was dissolved. The powder was wet-blended using zirconia balls with a diameter of 5 mm to prepare ceramic slurry. The prepared ceramic slurry was then used to form ceramic green sheets with a thickness of about 3 μm on a film for making the green sheets by doctor blading.

A metal paste as a metal containing a nickel powder was used for forming internal electrode layers. Ethylcellulose as a resin was used for preparing the metal paste. A mixture of dihydroturpineol solvent and butyl cellosolve was used as a solvent.

The metal paste was printed on the ceramic green sheets to obtain green sheets with the metal paste. Subsequently, 200 green sheets with the metal paste were stacked. The ceramic green sheets as cover layers were placed on the upper surface and the lower surface to obtain a base laminate. The base laminate was then cut into laminate compacts.

The laminate compacts were then fired to obtain a stack. The laminate compacts were fired with a temperature rise rate of 900° C./h and a maximum temperature of 1190° C. in a hydrogen-nitrogen environment. A firing furnace using a resistance heating method was used in the firing. The stacks were then reoxidized. The stacks were reoxidized at a maximum temperature of 1000° C. and a retention time of five hours in a nitrogen atmosphere. The resultant stacks each had the dimensions of 1.0×0.5×0.5 mm. The dielectric layers had an average thickness of 1.8 μm. The internal electrode layers had an average thickness of 0.7 μm. The capacitance of each of the obtained capacitors was set to a designed value of 1 μF.

After the stacks were barrel-polished, an external electrode paste was applied to the two ends of each stack. The stacks were then thermally treated at 800° C. to form external electrodes. The external electrode paste containing a Cu powder and glass was used. The surfaces of the external electrodes were then plated with Ni and then Sn using an electrolytic barrel machine to complete the capacitors.

The characteristics of the capacitors were evaluated by testing the high temperature-operating life in a HALT (highly accelerated life test). The high-temperature operating life was determined by applying a DC voltage of 45 V at an environmental temperature of 170° C. The MTTF (mean time to failure) was then obtained when the failure probability of the capacitors reached 50%. The shape parameter (m value) on the Weibull plot was also determined. A longer MTTF indicates a longer operating life. A greater m value indicates less variations in the operating life. The MTTF may be at least 15 hours, and the m value may be at least 3.

In examples 1 to 6, the mixing ratios of the raw material 1 (small particle size) and the raw material 2 (large particle size) are different. In examples 7 and 8, the raw material mixing ratio is the same as in example 3. The arithmetic mean grain size D1 of the first crystal grains 6A and the arithmetic mean grain size D2 of the second crystal grains 6B are different. In example 7, D2=1.8D1. In example 8, D2=3.2D1. Comparative example 1 uses the raw material 1 alone without using the raw material 2. Comparative example 2 uses the raw material 2 alone without using the raw material 1. The evaluation results are shown in Table 1. The raw material mixing ratios in Table 1 indicate the percentages of the raw material 2 when the total amount of the raw materials 1 and 2 is 100.

TABLE 1

| | Mixing ratio of raw material (raw material 2) (wt %) | D1 (μm) | D2 (μm) | Dy content of first crytal grain (atomic %) | Dy content of second crytal grain (atomic %) | Mg content of first crytal grain (atomic %) | Mg content of second crytal grain (atomic %) | Area percentage of second crytal grain (%) | The number of second crystal grains continuous with one another | Operating life (hours) | m value (—) |
|---|---|---|---|---|---|---|---|---|---|---|---|
| Comparative example 1 | 0 | 0.15 | — | 0.1 | — | 0.1 | — | — | — | 13.4 | 2.1 |
| Example 1 | 3 | 0.16 | 0.33 | 0.1 | 0.4 | 0.1 | 0.3 | 2.9 | 2 | 17.4 | 3.8 |
| Example 2 | 4 | 0.15 | 0.42 | 0.1 | 0.5 | 0.1 | 0.4 | 4.1 | 2 | 24.7 | 4.2 |
| Example 3 | 4 | 0.15 | 0.34 | 0.1 | 0.6 | 0.1 | 0.4 | 4.5 | 1 | 27.7 | 4.5 |
| Example 4 | 10 | 0.16 | 0.34 | 0.1 | 0.6 | 0.1 | 0.4 | 9.6 | 1 | 36.5 | 5.7 |
| Example 5 | 17 | 0.15 | 0.33 | 0.1 | 0.6 | 0.1 | 0.4 | 17.7 | 2 | 28.9 | 5.1 |
| Example 6 | 24 | 0.18 | 0.4 | 0.1 | 0.8 | 0.1 | 0.5 | 25.6 | 3 | 15.3 | 3.4 |
| Example 7 | 4 | 0.17 | 0.31 | 0.1 | 0.9 | 0.1 | 0.5 | 4.2 | 2 | 24.8 | 3.1 |
| Example 8 | 4 | 0.16 | 0.49 | 0.1 | 0.4 | 0.1 | 0.3 | 4 | 2 | 21.2 | 3 |

TABLE 1-continued

|  | Mixing ratio of raw material (raw material 2) (wt %) | D1 (μm) | D2 (μm) | Dy content of first crytal grain (atomic %) | Dy content of second crystal grain (atomic %) | Mg content of first crytal grain (atomic %) | Mg content of second crystal grain (atomic %) | Area percentage of second crystal grain (%) | The number of second crystal grains continuous with one another | Operating life (hours) | m value (—) |
|---|---|---|---|---|---|---|---|---|---|---|---|
| Comparative example 2 | 100 | — | 0.5 | — | 0.8 | — | 0.6 | — | — | 10.5 | 2.2 |
| Comparative example 3 | 4 | 0.05 | 0.34 | 0.1 | 0.6 | 0.1 | 0.4 | 4.4 | 1 | 36.4 | 2.3 |

As shown in comparative examples 1 and 2, with crystal grains having a small grain size alone or a large grain size alone, the operating life of the capacitor is short and the variations in the operating life are large. As shown in comparative example 3, with crystal grains having a grain size that is too small, the variations in the operating life are large. In contrast, the capacitors in examples 1 to 8 all have a long operating life and small variations in the operating life. The second crystal grains in examples 2 to 5 have area percentages of 4 to 18% inclusive. The capacitors in these examples have an operating life of 20 hours or longer and an m value of 4 or greater, with high reliability. In examples 1 and 6, the area percentages of the second crystal grains are outside the ranges, indicating that the capacitors in these examples are less reliable than those in examples 2 to 5. In examples 7 and 8, the mean grain sizes of the first crystal grains 6A and the second crystal grains 6B are outside the range of 2D1≤D2<3D1. The capacitors in these examples have a sufficiently long life but have an m value of about 3 and thus have various operating lives. The second crystal grains in examples 1 to 8 have the core-shell structure.

The present disclosure may be implemented in the following forms.

In an embodiment of the present disclosure, a capacitor includes a stack including a plurality of dielectric layers and a plurality of internal electrode layers alternately stacked on one another, and an external electrode located on a surface of the stack and electrically connected to the plurality of internal electrodes. The plurality of dielectric layers includes crystal grains containing barium titanate and an additive element. The crystal grains include first crystal grains and second crystal grains having a grain size larger than the first crystal grains. The first crystal grains satisfy 0.13 μm≤d1<0.30 where d1 is a grain size of the first crystal grains. The second crystal grains satisfy 0.30 μm≤d2<0.50 where d2 is the grain size of the second crystal grains. The second crystal grains have a higher additive element content than the first crystal grains.

The capacitor according to one or more embodiments of the present disclosure can reduce the degradation of the characteristics and thus has improved reliability.

Although the embodiments of the present disclosure have been described in detail, the present disclosure is not limited to the above embodiments, and may be modified or changed variously without departing from the spirit and scope of the present disclosure. The components described in the above embodiments may be entirely or partially combined as appropriate unless any contradiction arises.

REFERENCE SIGNS 1 stack
3 external electrode
5 dielectric layer
6 crystal grain
6A first crystal grain
6B second crystal grain
7 internal electrode layer
6B1 core
6B2 shell
100 capacitor

The invention claimed is:

1. A capacitor, comprising:
   a stack including a plurality of dielectric layers and a plurality of internal electrode layers alternately stacked on one another; and
   an external electrode on a surface of the stack, the external electrode being electrically connected to the plurality of internal electrodes,
   the plurality of dielectric layers including crystal grains comprising barium titanate and an additive element,
   the crystal grains including first crystal grains and second crystal grains having a grain size larger than the first crystal grains,
   the first crystal grains satisfying 0.13 μm≤d1<0.30 μm, where d1 is a grain size of the first crystal grains, the second crystal grains satisfying 0.30 μm≤d2<0.50 μm, where d2 is the grain size of the second crystal grains,
   the second crystal grains having a higher additive element content than the first crystal grains,
   the second crystal grains having an area percentage of 4 to 18% inclusive per unit area in a cross section of the plurality of dielectric layers.

2. The capacitor according to claim 1, wherein
   the second crystal grains continuous with one another in the cross section of the plurality of dielectric layers are two or fewer second crystal grains.

3. The capacitor according to claim 1, wherein
   the second crystal grains include a core-shell structure including a core comprising barium titanate crystals and a shell surrounding the core and comprising the additive element dispersed in the barium titanate crystals.

4. The capacitor according to claim 1, wherein
   the first crystal grains and the second crystal grains satisfy 2D1<D2<3D1, where D1 is an arithmetic mean grain size of the first crystal grains and D2 is an arithmetic mean grain size of the second crystal grains.

5. The capacitor according to claim 1, wherein the additive element includes at least one selected from the group consisting of dysprosium, magnesium, and calcium.

* * * * *